United States Patent
Lee et al.

(10) Patent No.: US 12,140,069 B2
(45) Date of Patent: Nov. 12, 2024

(54) INTEGRATED COOLING MODULE

(71) Applicant: COAVIS, Sejong-si (KR)

(72) Inventors: Hyun Tae Lee, Sejong-si (KR); Woo Keun Lee, Sejong-si (KR); Hyuk Jin Lee, Sejong-si (KR); Dong Heon Mo, Sejong-si (KR); Daeil Hyun, Chungcheongnam-do (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 18/340,617

(22) Filed: Jun. 23, 2023

(65) Prior Publication Data
US 2024/0263576 A1 Aug. 8, 2024

(30) Foreign Application Priority Data
Jun. 23, 2022 (KR) .................. 10-2022-0076657

(51) Int. Cl.
| | | |
|---|---|---|
| *F01P 5/10* | (2006.01) | |
| *B60K 1/00* | (2006.01) | |
| *B60K 11/02* | (2006.01) | |
| *F01P 3/20* | (2006.01) | |
| *F01P 7/14* | (2006.01) | |
| *F01P 7/16* | (2006.01) | |

(Continued)

(52) U.S. Cl.
CPC ........ *F01P 5/10* (2013.01); *F01P 3/20* (2013.01); *F01P 7/165* (2013.01); *F01P 11/029* (2013.01); *F04C 2/16* (2013.01); *F04C 2/165* (2013.01); *F04C 14/10* (2013.01); *F04C 15/06* (2013.01); *B60K 2001/003* (2013.01); *B60K 11/02* (2013.01); *F01P 2007/146* (2013.01); *F01P 2050/22* (2013.01); *F01P 2050/24* (2013.01); *F04C 2210/208* (2013.01)

(58) Field of Classification Search
CPC ............ F01P 5/10–12; F01P 2005/125; F01P 11/029; F04C 2/16
See application file for complete search history.

(56) References Cited

U.S. PATENT DOCUMENTS

2022/0140420 A1* 5/2022 Kim .................. H01M 10/6556
62/190
2022/0314737 A1* 10/2022 Hwang .................. F01P 11/029
(Continued)

FOREIGN PATENT DOCUMENTS

CN 218021197 U * 12/2022
GB 2337235 A * 11/1999 ................ B60S 1/50
(Continued)

*Primary Examiner* — Laert Dounis
(74) *Attorney, Agent, or Firm* — Kilpatrick Townsend & Stockton LLP

(57) ABSTRACT

Provided is a cooling module including a reservoir tank in which cooling water is stored, a screw pump coupled to the reservoir tank and having a cooling water inlet communicating with the reservoir tank to pump cooling water, and a direction control valve coupled to the reservoir tank, having an outlet port communicating with the reservoir tank, and having a plurality of inlet ports to change a direction of flow of cooling water according to an operation, so that efficiency corresponding to the use of a plurality of centrifugal pumps of the related art may be achieved by using a single screw pump, thereby reducing the number of parts and simplifying a package, while simplifying the configuration.

9 Claims, 10 Drawing Sheets

(51) Int. Cl.
    *F01P 11/02*     (2006.01)
    *F04C 2/16*     (2006.01)
    *F04C 14/10*     (2006.01)
    *F04C 15/06*     (2006.01)

(56) References Cited

U.S. PATENT DOCUMENTS

| | | | | |
|---|---|---|---|---|
| 2022/0325657 A1* | 10/2022 | Jeong | ............ | F01P 5/10 |
| 2022/0344747 A1* | 10/2022 | Pawellek | ............ | H01M 10/613 |
| 2022/0403770 A1* | 12/2022 | Kim | ............ | F01P 5/10 |
| 2023/0082483 A1* | 3/2023 | Buvarp | ............ | F01P 3/20 |
| | | | | 220/564 |
| 2023/0258118 A1* | 8/2023 | Choi | ............ | F01P 11/04 |
| | | | | 123/41.51 |

FOREIGN PATENT DOCUMENTS

| | | | | | |
|---|---|---|---|---|---|
| GB | 2401396 A | * | 11/2004 | ............ | F04C 11/008 |
| KR | 2022-0043563 A | | 4/2022 | | |
| WO | WO-2023080448 A1 | * | 5/2023 | ............ | F01P 11/029 |

* cited by examiner

PRIOR ART

INTEGRATED COOLING MODULE

CROSS-REFERENCE TO RELATED APPLICATIONS

This application claims priority under 35 U.S.C. § 119 to Korean Patent Application No. 10-2022-0076657, filed on Jun. 23, 2022, in the Korean Intellectual Property Office, the disclosure of which is incorporated herein by reference in its entirety.

TECHNICAL FIELD

The following disclosure relates to a cooling module in which a reservoir tank, a cooling water pump, and a direction control valve for pumping and circulating cooling water in a cooling system of a vehicle are integrally modularized.

BACKGROUND

Electric vehicles drive using motors that are driven by power from batteries or fuel cells, and therefore, carbon emissions and noise are low. In addition, electric vehicles are environmentally friendly because they use motors that are more energy efficient than existing engines.

Such electric vehicles are equipped with a heat management system for cooling electric parts, such as heating and cooling for indoor air conditioning and driving motors, batteries, and inverters.

However, the heat management system includes a cooling water system for indoor heating of vehicles and cooling and heating electrical parts of vehicles. The cooling water system includes many parts for circulation of cooling water and many pipes connecting the parts, and thus, a process for assembling the cooling water system is complicated and difficult. In addition, since pipes connecting the parts are elongated, the loss of efficiency of the system due to a pressure drop of flowing cooling water may increase.

Accordingly, as illustrated in FIG. 1, the conventional cooling water module for a vehicle includes a first circulation pump 31 and a second circulation pump 32, which are a plurality of cooling water pumps, and is configured to circulate cooling water in a cooling line passing through a battery using the first circulation pump and circulate cooling water in a cooling line passing through a battery electrical equipment using the second circulation pump 32. In addition, the cooling water system is simplified by configuring the first circulation pump 31, the second circulation pump 32, a reservoir tank 10, and a valve 20 capable of controlling a cooling water connection between parts as an integral module.

Here, a centrifugal pump is generally used as a cooling water pump for pumping cooling water. In the related art, a plurality of cooling water pumps are used to satisfy performance, efficiency, size, and noise of the cooling water pump.

However, since the cooling water system also uses a plurality of cooling water pumps, pipes connecting parts are elongated and complicated, and loss of system efficiency occurs due to a pressure drop of cooling water.

RELATED ART DOCUMENT

Patent Document

KR 10-2022-0043563 A (Apr. 5, 2022) "Cooling water module for vehicle"

SUMMARY

An exemplary embodiment of the present invention is directed to providing a cooling module capable of achieving efficiency corresponding to the use of a plurality of centrifugal pumps of the related art by using a single screw pump, thereby reducing the number of parts and simplifying a package, while having a simple configuration.

In one general aspect, a cooling module includes: a reservoir tank in which cooling water is stored; a screw pump coupled to the reservoir tank and having a cooling water inlet communicating with the reservoir tank to pump cooling water; and a direction control valve coupled to the reservoir tank, having an outlet port communicating with the reservoir tank, and having a plurality of inlet ports to change a direction of flow of cooling water according to an operation.

The screw pump may be disposed on one side of the reservoir tank, and the direction control valve may be disposed on the other side of the reservoir tank.

The cooling module may further include: a controller connected to the screw pump and the direction control valve to control the operation, wherein the controller is disposed on a side surface other than a side surface of the reservoir tank in which the screw pump and the direction control valve are disposed and coupled to the reservoir tank.

The screw pump is only one screw pump.

An inside of the reservoir tank may be formed as one communicated space without a partition dividing the space so that the cooling water is separately accommodated.

The outlet port of the direction control valve may be connected to a side surface of the reservoir tank.

The screw pump may include a driving screw connected to and driven by a motor unit and a driven screw rotated in engagement with the driving screw.

The driven screw may be provided in plurality.

Blades spirally formed in an axial direction of the driving screw may be formed in two or more lines.

A concave pump mounting portion may be formed in the reservoir tank, and a pump unit of the screw pump may be inserted and coupled to the pump mounting portion.

A cut-out groove may be formed in the pump mounting portion of the reservoir tank, and a cooling water discharge port of the screw pump may be disposed in the cut-out groove.

The reservoir tank may have an inlet guide portion concave downwardly from a bottom, and a cooling water inlet of the screw pump may be inserted into the inlet guide portion.

Other features and aspects will be apparent from the following detailed description, the drawings, and the claims.

DETAILED DESCRIPTION OF EXEMPLARY EMBODIMENTS

Hereinafter, a cooling module of the present invention will be described in detail with reference to the accompanying drawings.

Figure 1:
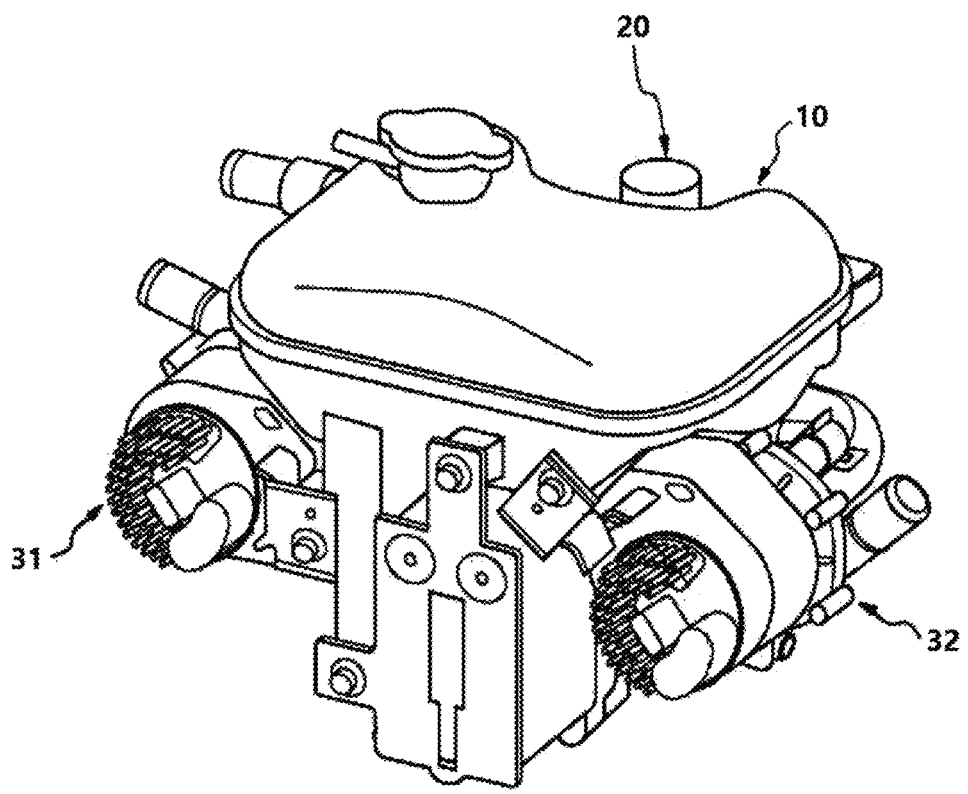
FIG. 1 is a perspective view illustrating a cooling water module for a vehicle of the related art.
Figure 2:
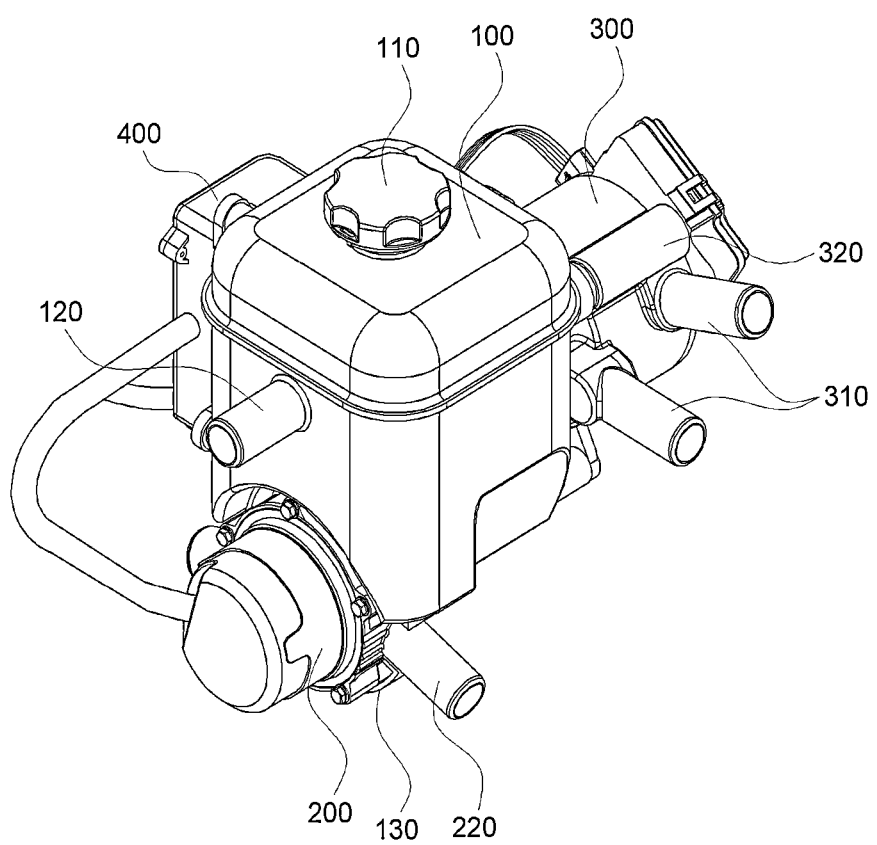
FIGS. 2 to 5 are an assembled perspective view, an exploded perspective view, and a front cross-sectional view illustrating a cooling module according to an exemplary embodiment of the present invention.
Figure 3:
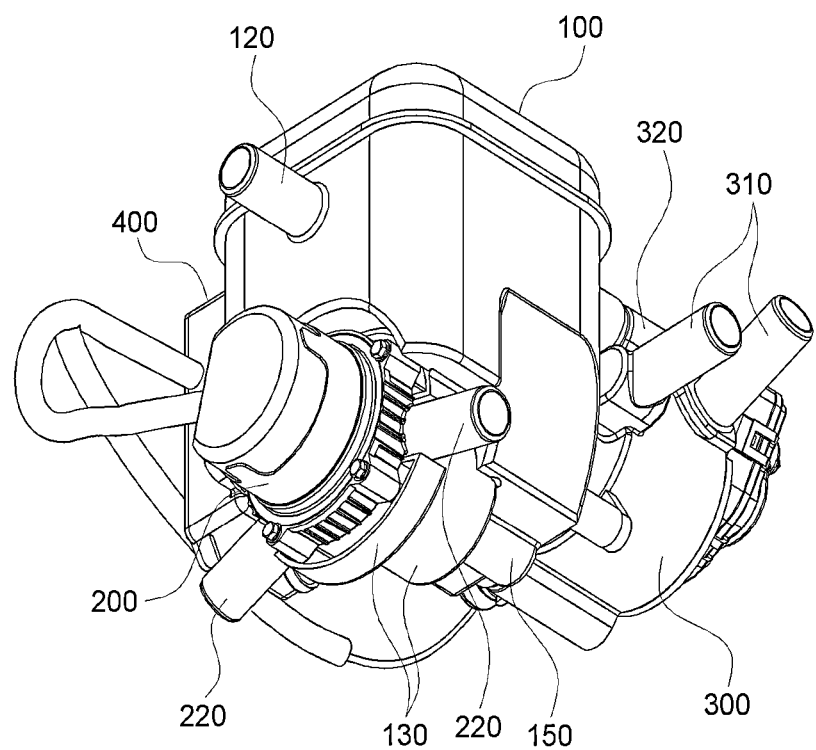
Figure 4:
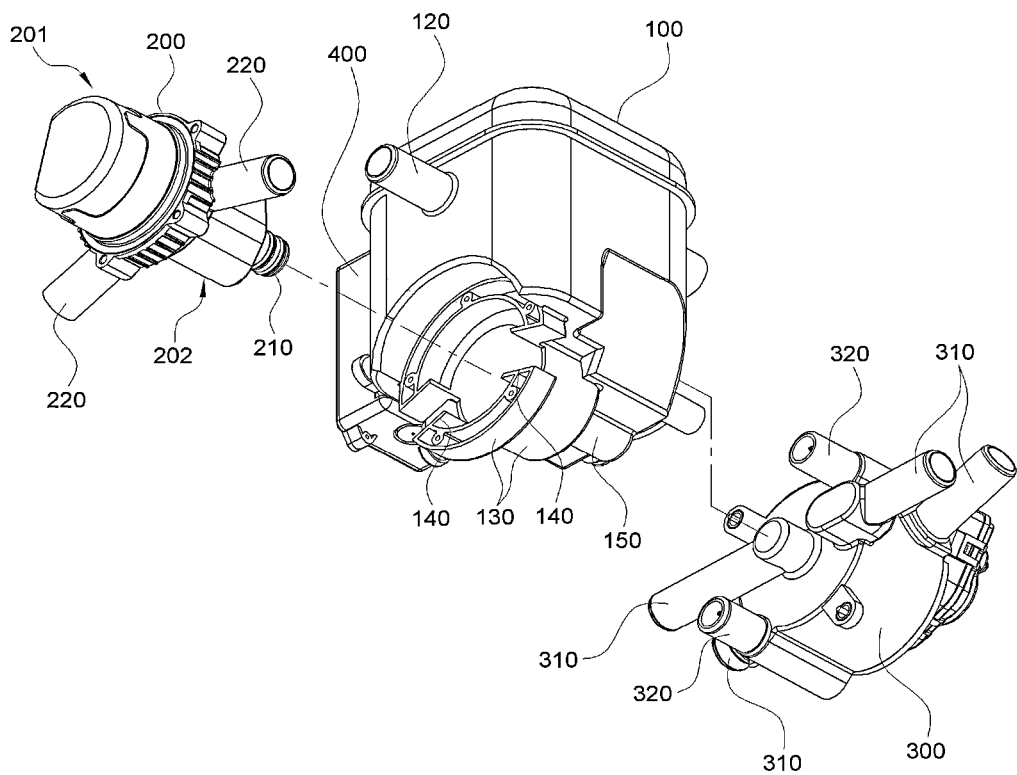
Figure 5:
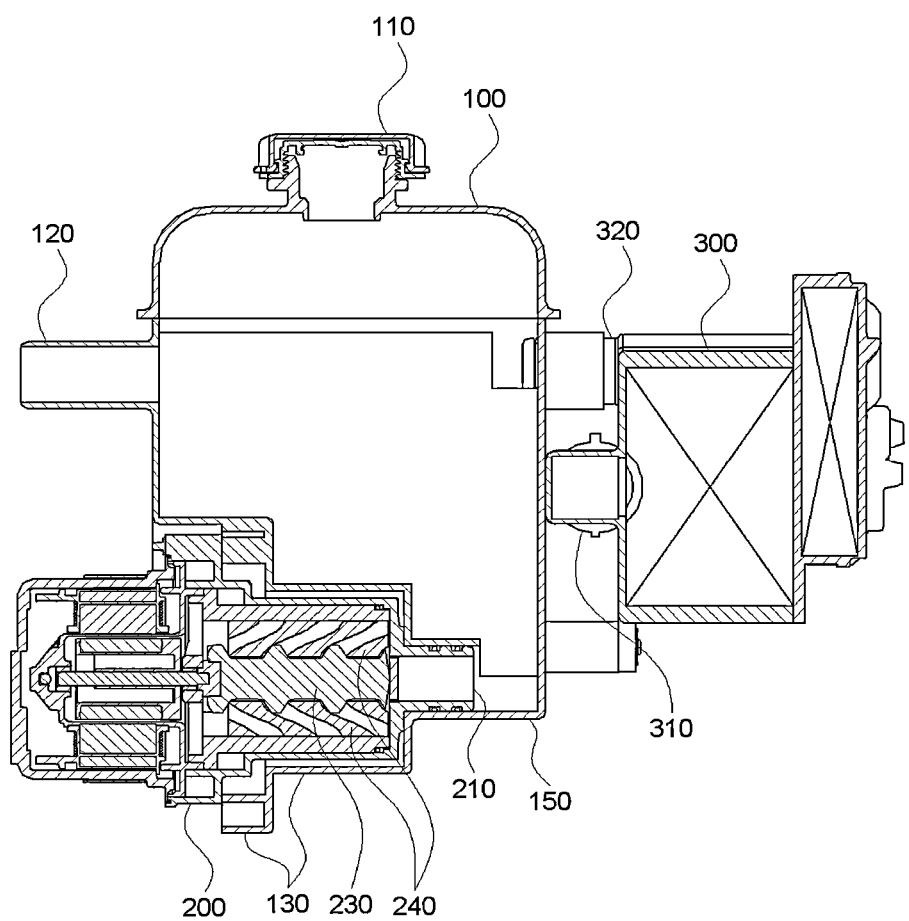
Figure 6:
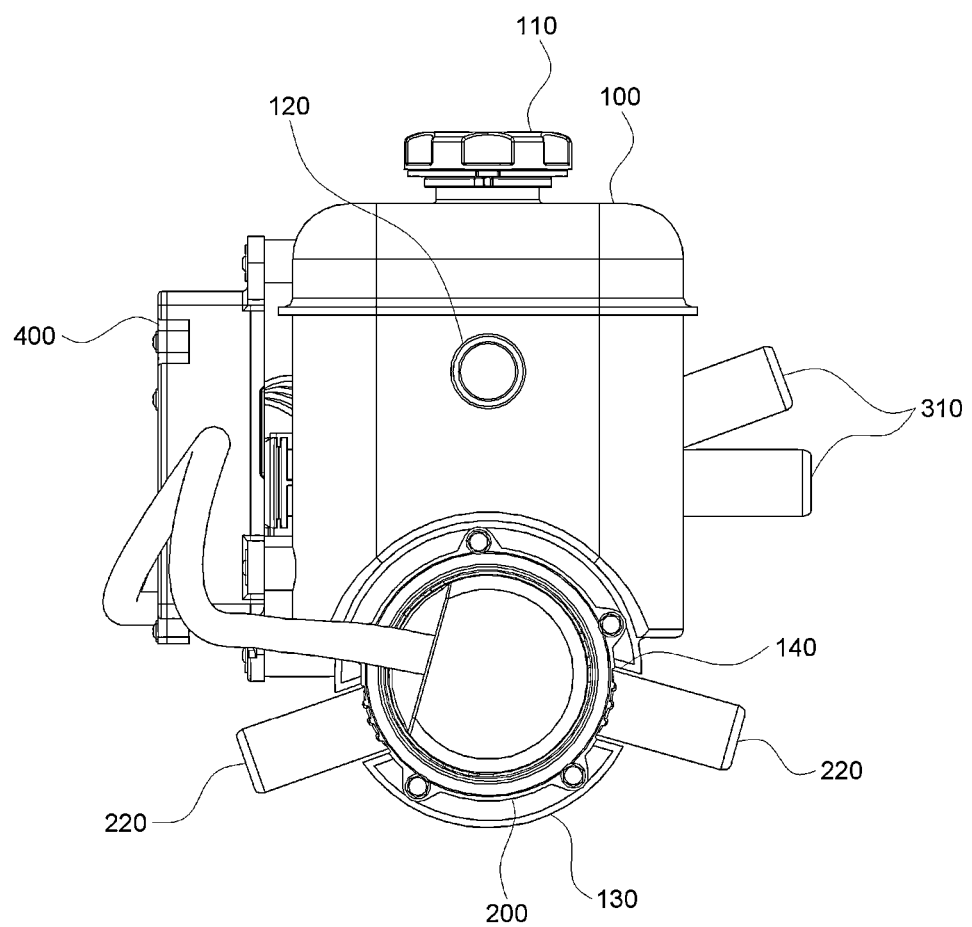
FIGS. 6 to 8 are a left side view, a right side view, and a bottom plan view illustrating a cooling module according to an exemplary embodiment of the present invention.
Figure 7:
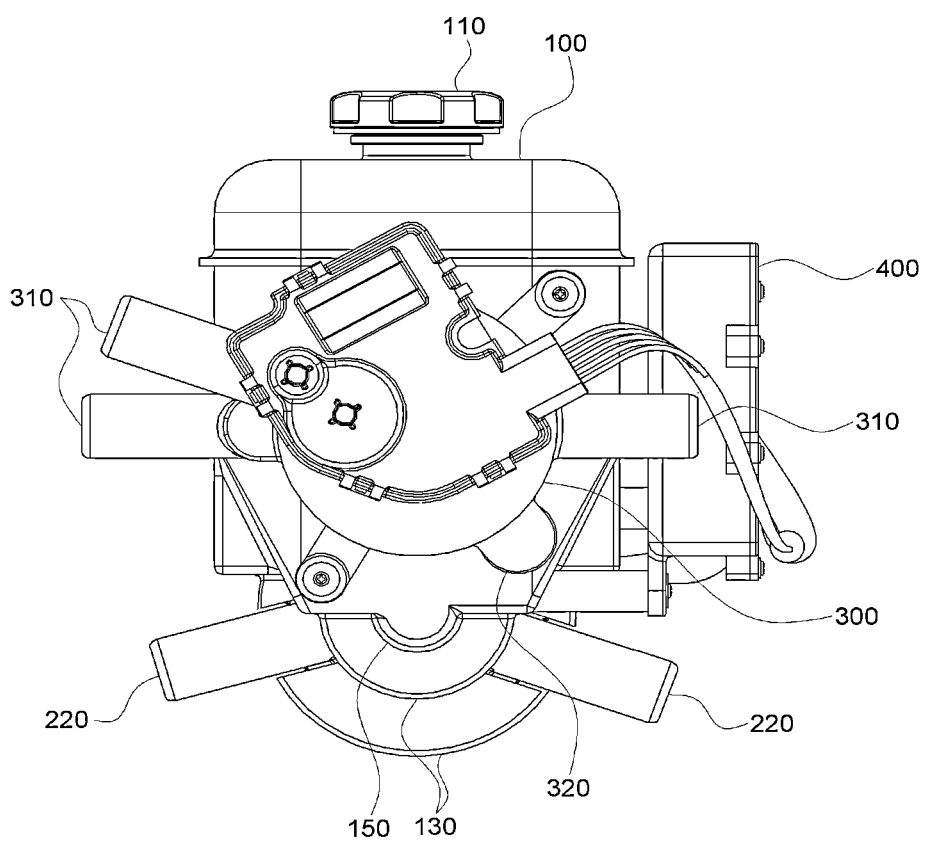
Figure 8:
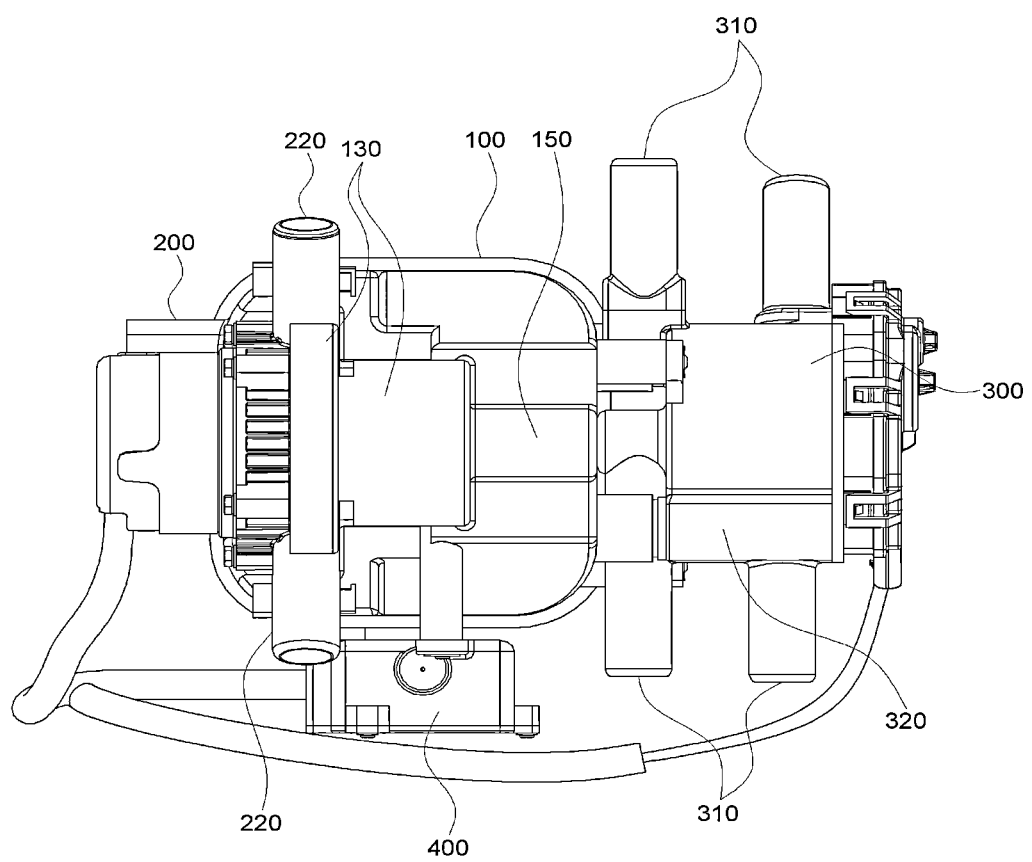

FIGS. 2 to 5 are an assembled perspective view, an exploded perspective view, and a front cross-sectional view illustrating a cooling module according to an exemplary embodiment of the present invention, and FIGS. 6 to 8 are a left side view, a right side view, and a bottom plan view illustrating a cooling module according to an exemplary embodiment of the present invention.

As shown, a cooling module according to an exemplary embodiment of the present invention may include a reservoir tank 100, a screw pump 200, and a direction control valve 300, and may further include a controller 400.

The reservoir tank 100 may store cooling water and supply cooling water to the screw pump 200. An empty space may be formed in the reservoir tank 100 so that cooling water may be stored therein, and a pressure cap 110 may be coupled to an upper surface of the reservoir tank 100 so that internal pressure of the reservoir tank 100 may be regulated by the pressure cap 110. In addition, the reservoir tank 100 may have a cooling water inlet 120 formed on a side surface of the reservoir tank 100 so that cooling water may flow in from a radiator, or the like, therethrough, and a communication hole may be formed on the side surface of the reservoir tank 100 and communicates with an outlet port of the direction control valve 300 to allow cooling water to flow in therethrough. Here, the reservoir tank 100 may be formed of a single communicating space without a partition dividing an internal space thereof, so that cooling water may be accommodated in the single space without being separately accommodated inside the reservoir tank 100.

The screw pump 200 is a cooling water pump receiving cooling water from the reservoir tank 100 and pumping the cooling water to a required location, and only one screw pump 200 may be provided. Further, the screw pump 200 is a type of pump pumping fluid by a change in volume between a plurality of screws as the screws are engaged to rotate. The screw pump 200 is disposed on and coupled to a lower end adjusted to one side surface of the reservoir tank 100, and as a cooling water inlet 210 is connected to the reservoir tank 100, cooling water inside the reservoir tank 100 may smoothly flow toward the screw pump 200. Here, a pump mounting portion 130 may be formed to be concave on a lower surface of the reservoir tank 100, and the pump unit 202 of the screw pump 200 may be inserted into and coupled to the pump mounting portion 130. In addition, a cut-out groove 140 may be formed in the pump mounting portion 130 of the reservoir tank 100 in a form with a portion removed, and the cooling water discharge port 220 of the screw pump 200 may be inserted into the cut-out groove 140. Accordingly, the cooling water discharge port 220 of the screw pump 200 may be easily drawn out through the cut-out groove 140. In addition, the reservoir tank 100 may have a cooling water outlet 150 formed concave downwardly from the bottom, the cooling water outlet 150 may communicate with the inside of the pump mounting portion 130, and the cooling water inlet 210 of the screw pump 200 may be inserted and disposed in the cooling water outlet 150 to communicate therewith. Thus, since the cooling water inlet 210 of the screw pump 200 is disposed in and connected to the cooling water outlet 150 disposed at the lowermost end in the direction of gravity, cooling water may be smoothly introduced into the screw pump 200.

The direction control valve 300 may be a valve that may change a direction of flow of cooling water according to an operation. The direction control valve 300 may be coupled to the reservoir tank 100 and has an outlet port 320 connected to and communicate with the reservoir tank 100. Also, the outlet port 320 of the direction control valve 300 may be connected to a side surface of the reservoir tank 100. In addition, the direction control valve 300 may be disposed on a side surface of the reservoir tank 100 opposite to the screw pump 200 based on the reservoir tank 100. In addition, the direction control valve 300 may have a plurality of inlet ports 310 and a plurality of outlet ports 320 as well. Here, the inlet port 310 may serve as both an inlet and an outlet according to the operation of the direction control valve 300.

The controller 400 may be connected to the screw pump 200 and the direction control valve 300 by a cable to control operations thereof. In addition, the controller 400 may be disposed on the other side surface of the reservoir tank 100, except for the side surface on which the screw pump 200 and the direction control valve 300 are disposed, and coupled to the reservoir tank 100.

Figure 9:
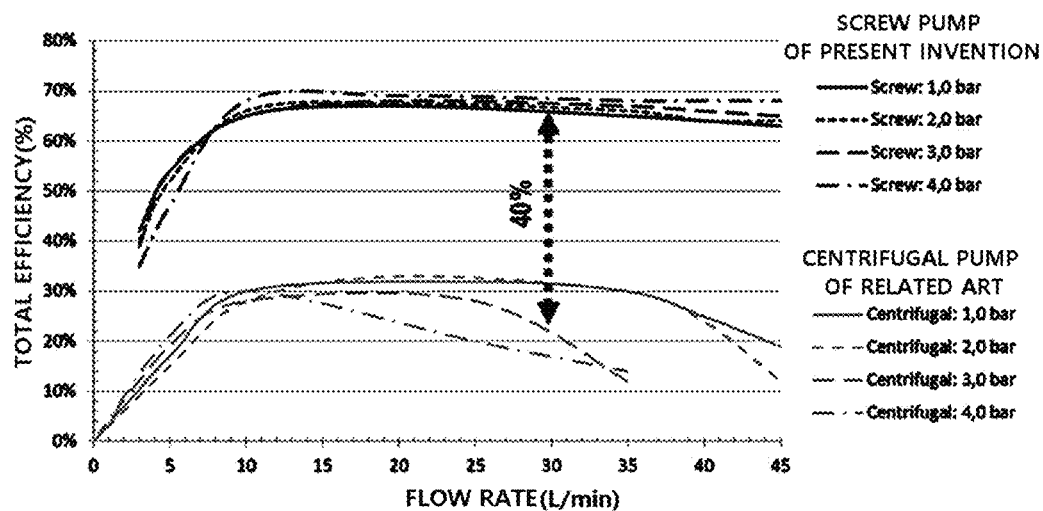
FIG. 9 is a graph illustrating the comparison of a flow rate and total efficiency of a screw pump of a cooling module according to the present invention and general centrifugal pump of the related art.

FIG. 9 is a graph illustrating the comparison of a flow rate and total efficiency of the screw pump of the cooling module according to the present invention and the centrifugal pump of the related art. Here, power of the screw pump according to the present invention and power of the centrifugal pump of the related art are under the same conditions. As illustrated in FIG. 9, it can be seen that the total efficiency of the screw pump is significantly higher than that of the centrifugal pump at the same discharge flow rate for each of the various discharge pressure. Also, at a specific discharge pressure and flow rate, the total efficiency was excellent by about 40% or more. In addition, it can be seen that, even if the discharge flow rate increases, the total efficiency of the screw pump rarely decreases after about 10 L/min, whereas the total efficiency of the centrifugal pump of the related art significantly decreases for a relatively specific pressure and flow rate range.

As described above, in the present invention, there is little change in total efficiency for various changes in discharge pressure and discharge flow rate and the total efficiency is significantly higher than that of centrifugal pump. Therefore, in the present invention, even if only one screw pump is used, the efficiency may be further improved, while securing the same performance compared to the related art. In particular, a better effect may be obtained in the case of relatively high pressure and high flow rate. Therefore, the present invention has the advantage of reducing the number of parts and simplifying the package, while the configuration of the cooling module is simple. In addition, since the internal space of the reservoir tank is a single space that is not partitioned, it is not necessary to separate temperatures of cooling water and the cooling system may be simplified.

Figure 10:
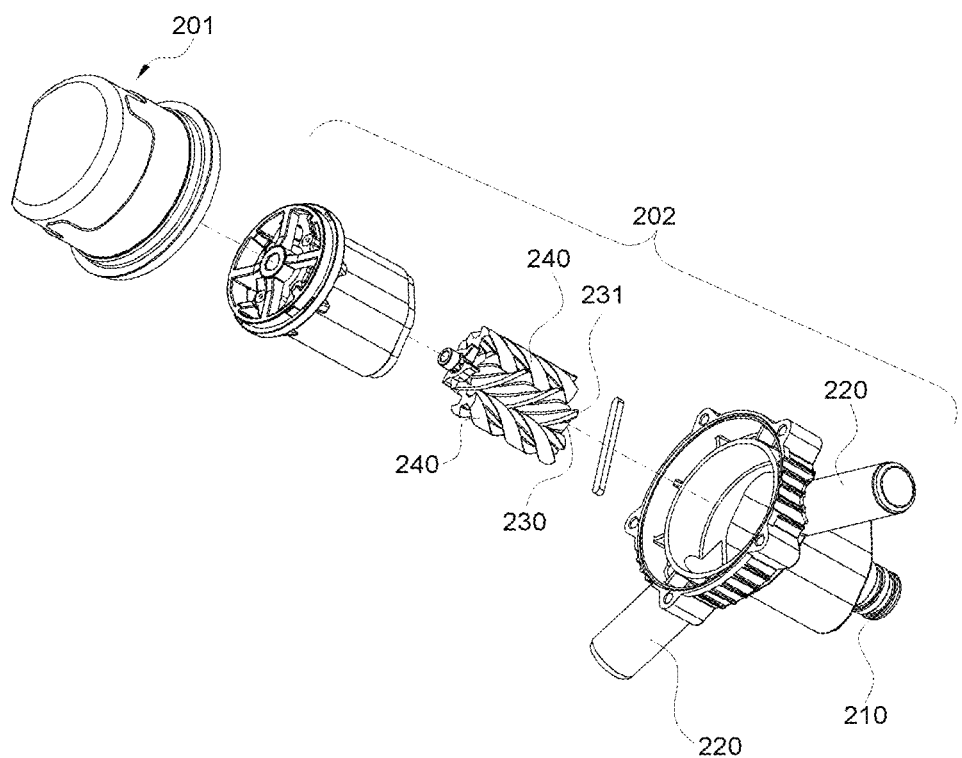
FIGS. 10 to 12 are an exploded perspective view and cross-sectional views illustrating a screw pump in a cooling module according to an exemplary embodiment of the present invention.
Figure 11:
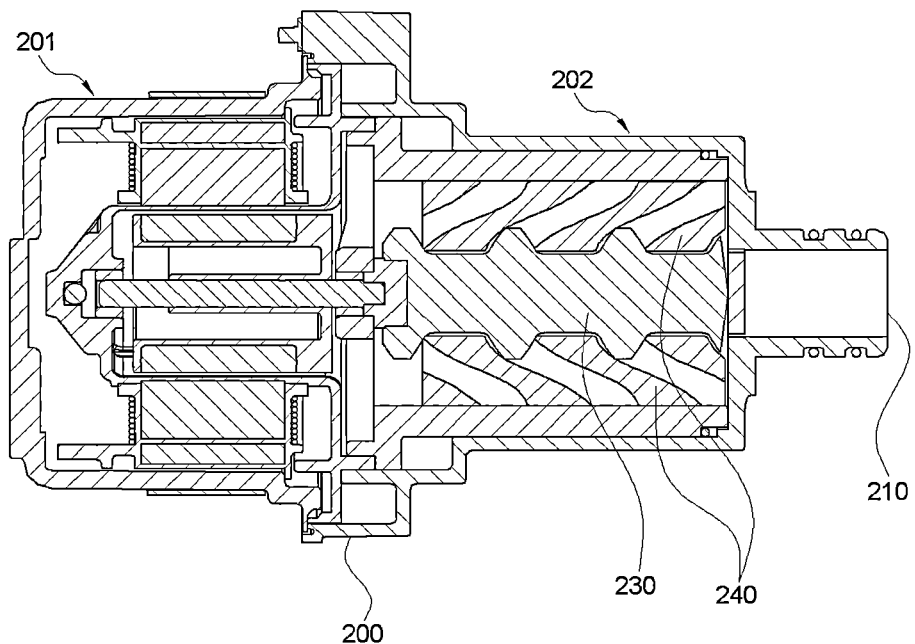
Figure 12:
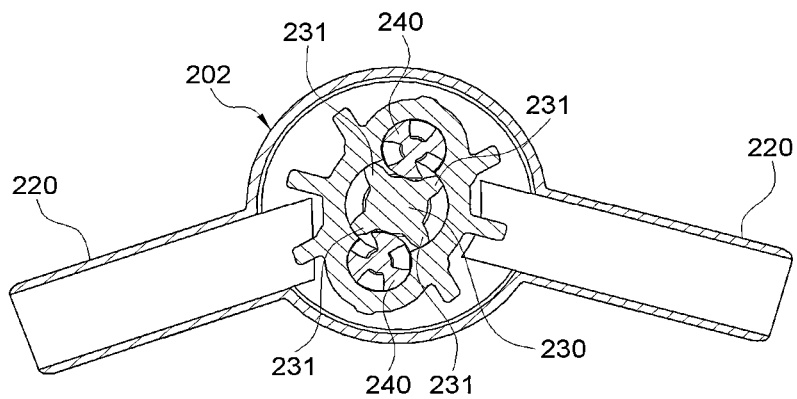

FIGS. 10 to 12 are an exploded perspective view and cross-sectional views illustrating a screw pump in a cooling module according to an exemplary embodiment of the present invention.

As shown, the screw pump 200 may include a motor unit 201 and a pump unit 202, and the pump unit 202 may include a driving screw 230 connected to and driven by the motor unit 201 and a driven screw 240 engaged with the driving screw 230 to rotate. Here, the driven screw 240 may be a single screw, but may be provided in plurality as shown. In addition, the driving screw 230 may have blades 231 formed spirally in an axial direction, and the blades 231 may be single screw-type blades formed in one line or may be blades formed in two or more lines. As shown, the blades 231 may be formed as blades in the form of four lines. Thus, sufficient discharge pressure and flow rate as required may be obtained without significantly increasing the size of the screw pump.

The water pump of the present invention may achieve efficiency corresponding to that of a plurality of centrifugal pumps used in the related art, by using a single screw pump, thereby reducing the number of parts and simplifying the package, while the configuration is simple.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

| | |
|---|---|
| 100: reservoir tank | 110: pressure cap |
| 120: cooling water inlet | 130: pump mounting portion |
| 140: cut-out groove | 150: cooling water outlet |
| 200: screw pump | |
| 201: motor unit | 202: pump unit |
| 210: cooling water inlet | 220: cooling water discharge port |
| 230: driving screw | 231: blade |
| 240: driven screw | |
| 300: direction control valve | |
| 310: inlet port | 320: outlet port |
| 400: controller | |

What is claimed is:

1. A cooling module comprising:
a reservoir tank in which cooling water is stored;
a screw pump coupled to the reservoir tank and having a cooling water inlet communicating with the reservoir tank to pump cooling water;
a direction control valve coupled to the reservoir tank, having an outlet port communicating with the reservoir tank, and having a plurality of inlet ports to change a direction of flow of cooling water according to an operation; and
a controller connected to the screw pump and the direction control valve to control the operation,
wherein the cooling module only has a single screw pump with multiple cooling water discharge ports,
wherein the screw pump is disposed on one side of the reservoir tank, and the direction control valve is disposed on the other side of the reservoir tank,
wherein the controller is disposed on a side surface other than a side surface of the reservoir tank in which the screw pump and the direction control valve are disposed and coupled to the reservoir tank.

2. The cooling module of claim 1, wherein an inside of the reservoir tank is formed as one communicated space without a partition dividing the space so that the cooling water is separately accommodated.

3. The cooling module of claim 1, wherein the outlet port of the direction control valve is connected to a side surface of the reservoir tank.

4. The cooling module of claim 1, wherein the screw pump includes a driving screw connected to and driven by a motor unit and a driven screw rotated in engagement with the driving screw.

5. The cooling module of claim 4, wherein the driven screw is provided in plurality.

6. The cooling module of claim 4, wherein blades spirally formed in an axial direction of the driving screw are formed in two or more lines.

7. The cooling module of claim 1, wherein a concave pump mounting portion is formed in the reservoir tank, and a pump unit of the screw pump is inserted and coupled to the pump mounting portion.

8. The cooling module of claim 7, wherein a cut-out groove is formed in the pump mounting portion of the reservoir tank, and a cooling water discharge port of the screw pump is disposed in the cut-out groove.

9. The cooling module of claim 1, wherein the reservoir tank has an inlet guide portion concave downwardly from a bottom, and a cooling water inlet of the screw pump is inserted into the inlet guide portion.

* * * * *